United States Patent [19]

Vaughan

[11] 4,359,117
[45] Nov. 16, 1982

[54] AUGER ASSEMBLY MOVING DEVICE

[76] Inventor: Hugh R. Vaughan, Box 531, Yorkton, Saskatchewan, Canada

[21] Appl. No.: 163,819

[22] Filed: Jun. 27, 1980

[51] Int. Cl.³ .................. B60K 25/00; B62D 51/04
[52] U.S. Cl. .................................. 180/11; 180/16; 180/19 R; 180/217
[58] Field of Search ............... 180/11, 14 R, 16, 19 R, 180/217

[56] References Cited

U.S. PATENT DOCUMENTS

| | | | |
|---|---|---|---|
| 1,419,722 | 6/1922 | Dittmar | 180/19 R |
| 2,523,171 | 9/1950 | Willey | 180/19 R |
| 2,535,614 | 12/1950 | Ausdall | 180/19 R |
| 2,805,536 | 9/1957 | De Vere Harnett | 180/19 R X |
| 2,818,139 | 12/1957 | Sutter | 180/15 X |
| 3,016,957 | 1/1962 | Olson | 180/19 R X |
| 3,199,621 | 8/1965 | Seaman | 180/74 X |
| 3,520,374 | 7/1970 | Ebert | 173/22 |
| 3,779,328 | 12/1973 | Wollenburg | 180/15 X |
| 4,271,919 | 6/1981 | Vaughan | 180/16 |

FOREIGN PATENT DOCUMENTS 1,080,656  7/1980  Canada.

Primary Examiner—Joseph Paul Brust
Attorney, Agent, or Firm—Stanley G. Ade

[57] ABSTRACT

Relatively heavy and large auger assemblies often used in present day farming are difficult to move and manoeuver around a farmyard or the like and it is not always convenient to hitch a tractor to such auger assemblies for relatively short distance moving. This invention includes a small electric or gasoline motor or engine which can be operatively connected to a small wheel which is mounted within a frame secured to the auger assembly framework and which engages the ground. Means are provided so that this small wheel can be rotated in either direction. A small castoring wheel assembly supports the rear end of the auger assembly and when the small wheel is operatively connected to the motor, the wheel may be rotated slowly thus enabling the auger assembly to be moved as desired. Directional control is by steering the rear end of the auger assembly manually.

17 Claims, 6 Drawing Figures

AUGER ASSEMBLY MOVING DEVICE

BACKGROUND OF THE INVENTION

This invention relates to new and useful improvements in devices for moving auger assemblies, particularly relatively heavy auger assemblies. It should be appreciated that the movements referred to are relatively small movements which may be required in or around a farmyard or the like and the device is not intended for long distance moving of the auger assembly, under which circumstances, it is usually hitched to a tractor or other source of motive power.

The relatively heavy auger assemblies used today in farming operations, are extremely difficult to manoeuver manually and it is obviously not always convenient or economical to hitch such auger assemblies to a tractor for the relatively small movements often required in positioning such auger assemblies in relation to materials to be picked up from one location and discharged at another.

SUMMARY OF THE INVENTION

This particular invention is an improvement of my United States patent application Ser. No. 044,719, filed June 1, 1979 now Pat. No. 4,271,919, dated June 9, 1981.

The present invention overcomes disadvantages of the general method of moving relatively large augers and in accordance with the invention there is provided a drive attachment for auger assemblies which include supporting structure, a pair of ground engaging wheels mounted upon a transverse axle and supporting an auger tube and flight assembly; said drive attachment comprising in combination a frame secured to said supporting structure, a ground engaging wheel drive, a drive wheel axle spanning said frame and being journalled for rotation within said frame, said drive wheel being secured to said drive wheel axle, gear means operatively connected to said drive wheel axle, drive means for said gear means selectively connectable to a source of power and means associated with said drive means to rotate said drive wheel selectively in either direction.

Another advantage of the present invention is to provide a device of the character herewithin described which is simple in construction, economical in operation and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
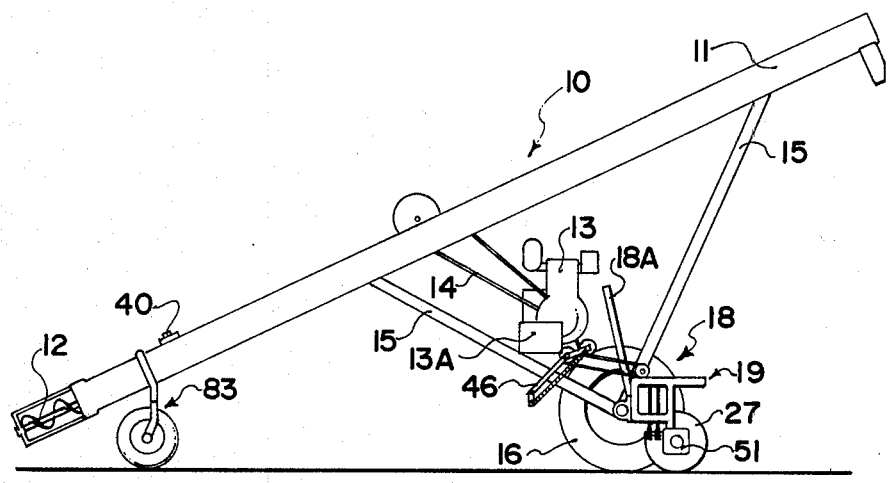
FIG. 1 is a side elevation of an auger assembly with the invention attached thereto.

Proceeding therefore to describe the invention in detail, reference character 10 illustrates an auger assembly including an elongated cylindrical auger tube 11, an auger flight assembly therein indicated at the lower end thereof by reference character 12, a source of power 13 operatively connected to the auger flight by means of belt 14, support arms 15 which are also used to raise and lower the auger assembly in a conventional manner, and ground engaging wheels 16, one of which is shown mounted upon a transverse axle 17 all of which is conventional.

The invention collectively designated 18 comprises a frame collectively designated 19 including spaced and parallel upper and lower horizontal members 20 and 21 respectively, transverse members 22 and 23 and vertical corner members 24 and 25 extending downwardly from the rear and front ends 24A and 25A of the members 20 respectively and being connected to the lower horizontal members 21 to provide a box-like frame. This frame is supported upon the transverse axle 17 by means of pillow block bearings 26 or the like and extends forwardly therefrom.

A ground engaging drive wheel 27 is secured to an axle which is journalled between pillow block bearings 29 secured to the front sides of the lower ends 30 of the front vertical members 25 which extend below the connection to the front ends of the horizontal members 21 as clearly shown in FIG. 2. The weight of the device 18 normally maintains wheel 27 in contact with the ground unless it is desired to transport the auger by a tractor or the like. Under these circumstances, the device is pivoted clear of the ground by means of a lever 18A extending up from frame 19. It pivots upon bearings 26 and may be detachably held in the raised position by any convenient latch means (not illustrated).

A source of power shown schematically by reference character 31, may take the form of an electric motor or a small gasoline engine and this is mounted within the supporting structure of the grain auger assembly in any convenient location adjacent to the drive wheel 27. The drive shaft 32 of the motor 31 includes a belt pulley 33 secured thereto and an endless belt 34 extends around this pulley 33. A main cross shaft 35 is journalled transversely upon the rear end of the upper side of the frame 19 within pillow blocks 36 and a pulley 37 is secured to this shaft on one end thereof and belt 34 extends around this pulley thus rotating shaft 35 when the belt is in the operative or drive position as will hereinafter be described.

A belt tightening assembly is provided collectively designated 38 and is mounted upon one of the supports 15 of the auger assembly substantially below the drive pulley 33 of the motor 31.

This assembly includes a bracket assembly 39 secured around the tube 15 and carrying an angulated arm 40 thereon extending rearwardly therefrom.

A pivoted arm 41 is pivotally secured by one end thereof to the front end of the angulated arm 40 by means of pivot pin 42 and a sheave or pulley 43 is journalled for rotation within the distal end of this pivoted arm 41.

Figure 2:
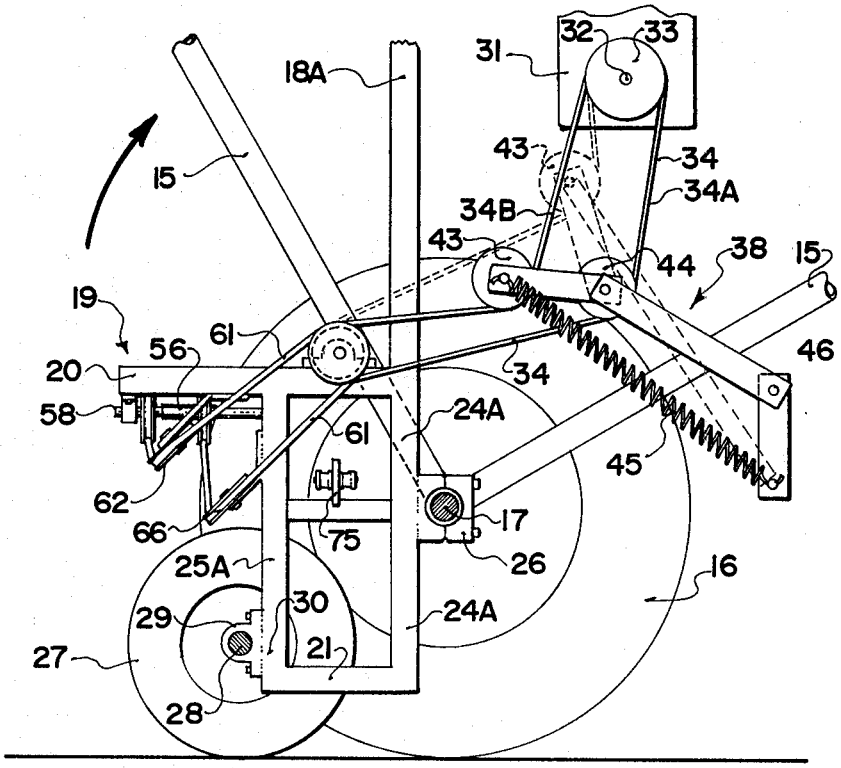
FIG. 2 is an enlarged fragmentary side elevation of the invention per se.

A fixed idler pulley 44 is mounted upon pivot pin 42 and engages inside the lower run 34A of the endless belt 34 as clearly illustrated in FIG. 2.

Figure 3:
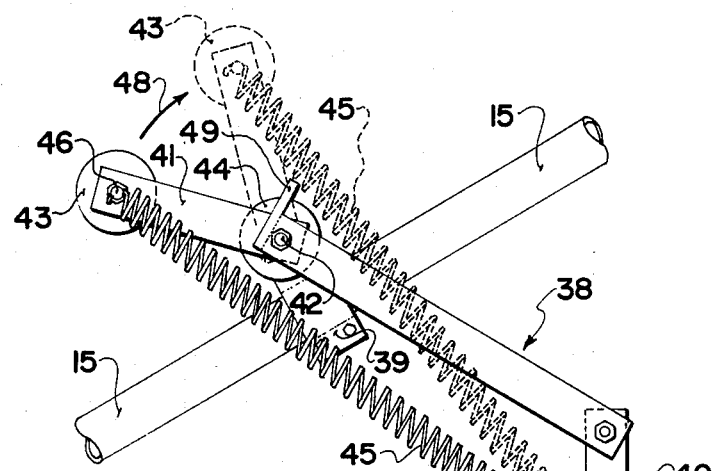
FIG. 3 is an enlarged fragmentary side elevation of the connecting and disconnecting means for the main drive belt.

The idler pulley or sheave 43 engages the upper run 34B of the endless belt 34 upon the outer side thereof when the pivoted arm 41 is in position shown in full line in FIGS. 2 and 3 and the necessary tension to tighten this belt is provided by means of a tension spring 45 extending between the spindle 46 mounting the pulley 43 and a pin 47 extending from the lower end of the angulated arm 40.

This tension spring provides sufficient pressure on the sheave 43 upon the upper run 34B to tighten the belt sufficiently to transmit drive from pulley 33 to pulley 37. When the lever 41 is moved manually in the direction of arrow 48, the spring pulls it over center and against a stop 49 thus slackening the belt 34 and disconnecting the pulley 33 from pulley 37.

Drive means collectively designated 50 are provided within the frame 19 and are operatively connected to gear means collectively designated 51 which in turn is connected to the axle shaft 28 to which the drive wheel 27 is secured.

The gear means preferably takes the form of a casing 52 secured to the frame 19 and the axle 28 extends through this casing and is provided with a skew gear 53 secured thereto and within the casing.

Figure 4:
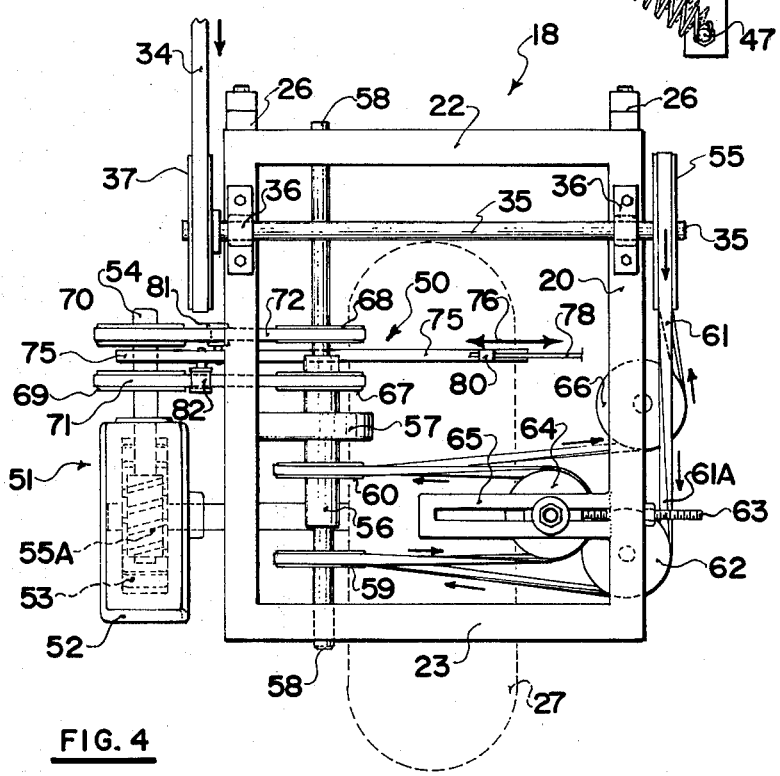
FIG. 4 is a top plan view of the invention per se.
Figure 5:
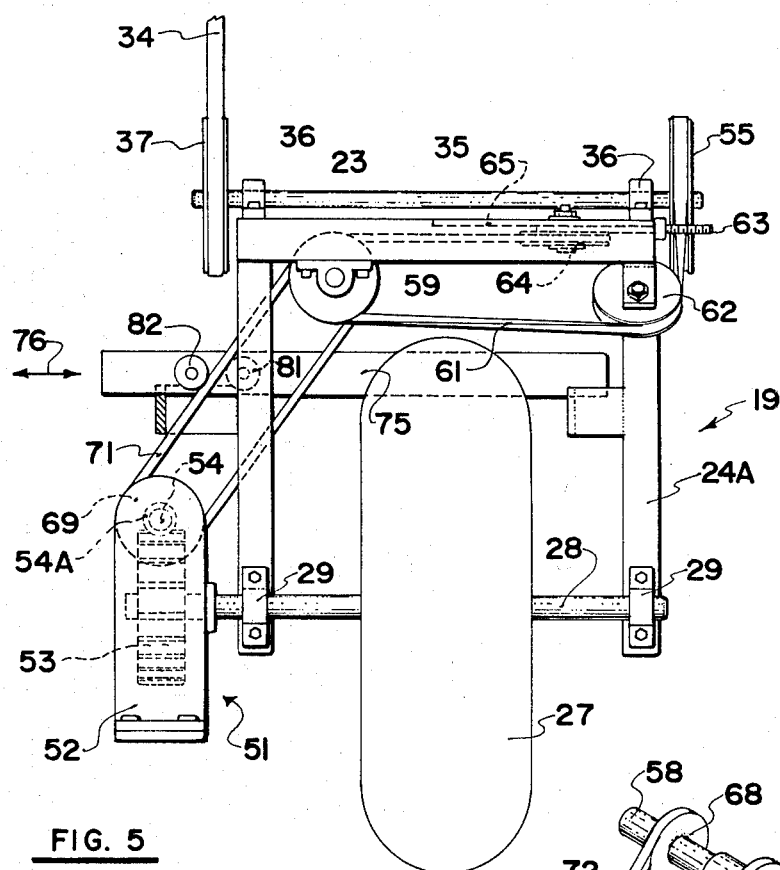
FIG. 5 is a front elevation of the invention per se.
Figure 6:
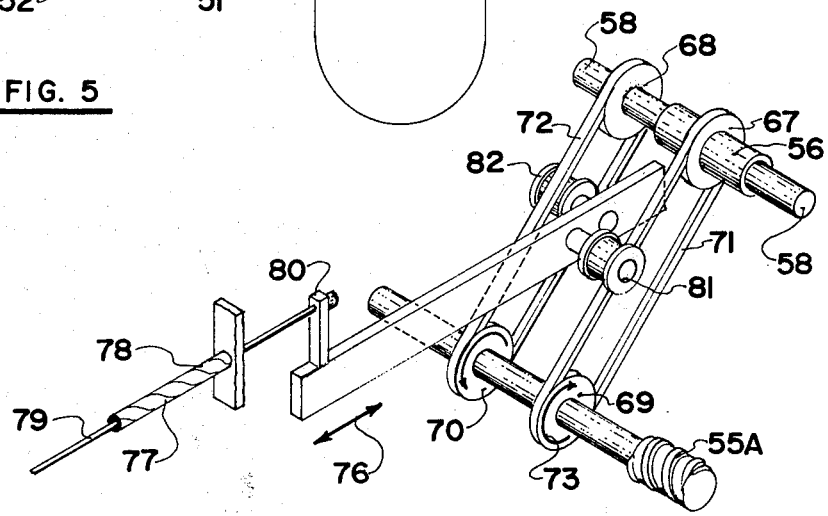
FIG. 6 is a fragmentary isometric view showing the reversing mechanism for the drive means.

A gear drive shaft 54 is journalled for rotation within the casing above the gear 53 and is provided with a worm gear 55A engaging the skew gear 53 with the drive shaft 54 extending rearwardly from the casing as clearly shown in FIG. 4.

The drive means 50 includes a drive pulley 55 secured to the other end of shaft 35 and rotated thereby.

A hollow shaft or sleeve 56 is journalled within the frame and within bearings 57 and a shaft 58 is also journalled within the frame and passes through the hollow shaft 56 and rotates independently therefrom.

A pulley 59 is secured to shaft 58 adjacent the front end thereof and a pulley 60 is secured to the hollow shaft also adjacent the front end thereof.

An endless belt 61 engages around pulley 55 with upper run 61A passing around a direction changing idler pulley 62 mounted in the frame with pin 63 guiding the change of direction of the belt. The belt then passes under the pulley 59, around the pulley and then around an adjustable idler pulley 64 mounted within a bracket 65 extending within the frame and it will be noted that this idler pulley 64 is at right angles to pulleys 59 and 60 and is situated therebetween and to one side thereof.

The belt 61 then passes over the top of pulley 60, around the pulley, around a direction changing idler pulley 66 and then back to pulley 55. It will therefore be appreciated that the run of the belt rotates pulley 59 in one direction and pulley 60 in the opposite direction together with the shaft 58 and hollow shaft 56 respectively.

A further pulley 67 is secured to the hollow shaft 56 adjacent the rear of the end thereof and a further pulley 68 is secured to shaft 58 also adjacent the rear end thereof with the two pulleys 67 and 68 being in substantial side by side relationship.

Corresponding pulleys 69 and 70 are secured to the portion of the drive shaft 54 extending rearwardly of the gear box 51 and a first slack belt 71 extends around pulleys 67 and 69 and a further slack belt 72 extends around pulleys 68 and 70.

Means are provided to tighten one or the other of the slack belts so that it will be appreciated that when the belt 72 is tightened, the drive shaft 54 will be rotated in the direction of arrow 73 and when this belt is loosened and belt 71 is tightened, the drive shaft 54 will be rotated in the opposite direction, namely in the direction of arrow 74 thus providing rotation in either direction of the drive wheel 27.

In this embodiment, a lever 75 is mounted for sliding movement in the direction of arrow 76, within the framework by conventional means (not illustrated) and this lever is reciprocated by means of a sliding cable 77 which is conventional and includes the stationary outer casing 78 and moving inner wire 79 which is connected to lever 75 via connecting lug 80.

A pair of cylindrical stub shafts 81 and 82 extend one upon each side of the lever or bar 75 with stub shaft 81 engaging the outer surface of belt 71 and stub shaft 82 engaging the inner surface of belt 72. It will therefore be seen that as the lever 75 is moved in the direction of arrow 76, either belt 71 or 72 are tightened with the other belt becoming slack.

The auger assembly is supported by a castoring tail wheel assembly collectively designated 83 secured adjacent the lower end of the auger tube 11 and the auger assembly may be manually steered by the rear end thereof by pushing it to one side or the other with the drive being provided by the drive wheel 27.

Finally, although one method is shown in the drawings for raising and lowering the wheel 27 relative to the ground, nevertheless a further method can be utilized (not illustrated). It is relatively simple to mount the frame members 24A so that they slide vertically to other members which are in turn secured to the clamp 26 around axle 17. Springs may normally react between the members secured to clamp 26 and the frame members 24A, urging the wheel 27 into contact with the ground and when it is desired to raise the wheel 27 clear of the ground, lever 18A may be modified to provide an over-center action to the frame members 24A and of course the remainder of the assembly, to raise the frame and the wheel 27 vertically against pressure of the springs which will return the wheel into contact with the ground when the position of the lever is reversed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A drive attachment for auger assemblies which include supporting structure, a pair of ground engaging wheels mounted upon a transverse axle and supporting an auger tube and flight assembly; said drive attachment comprising in combination a frame secured to said supporting structure, a ground engaging drive wheel, a drive wheel axle spanning said frame and being journalled for rotation within said frame, said drive wheel being secured to said drive wheel axle, gear means operatively connected to said drive wheel axle, drive means for said gear means selectively connectable to a source of power and means associated with said drive means to rotate said drive wheel selectively in either direction, means to engage and disengage said drive means from the source of power, said last mentioned means including a belt pulley driven by the source of power, a drive pulley on said frame operatively connected to said drive means and a belt extending around said pulleys, a belt tightening device mounted on said supporting structure selectively tightening and loosening said belt thereby engaging and disengaging the belt pulley with said drive pulley, said belt tightening device including an idler pulley mounted on said supporting structure, one run of said belt passing around said idler pulley, an arm pivoted to said supporting structure, said arm being movable from one position to another position and vice-versa, a further idler pulley journalled for rotation on the distal end of said arm, and engaging the other run of said belt and a tension spring urging said further pulley into engagement with said other run when said arm is in said one position and holding said arm over center and operatively disengaged from said other run, when said arm is in the other position.

2. A drive attachment for auger assemblies which include supporting structure, a pair of ground engaging wheels mounted upon a transverse axle and supporting an auger tube and flight assembly; said drive attachment comprising in combination a frame secured to said supporting structure, a ground engaging drive wheel a drive wheel axle spanning said frame and being journalled for rotation within said frame, said drive wheel being secured to said drive wheel axle, gear means operatively connected to said drive wheel axle, drive means for said gear means selectively connectable to a source of power and means associated with said drive means to rotate said drive wheel selectively in either direction, said drive means including a drive pulley on said frame, a lay shaft assembly in said frame, said lay shaft assembly including a hollow shaft journalled for rotation within said frame, a shaft within said hollow shaft also journalled for rotation within said frame independently of said hollow shaft, a pulley secured to said hollow shaft, a further pulley secured to said shaft within said hollow shaft, in side by side relationship with said first mentioned pulley, an adjustable idler pulley journalled for rotation in said frame between but spaced from said last mentioned pulleys and at right angles thereto, an endless belt extending around said drive pulley on said frame, around said pulley on said shaft, around said idler pulley in said frame, and around said pulley on said shaft within said hollow shaft, and back to said drive pulley, whereby said pulley on said hollow shaft is rotated in the opposite direction to said pulley on said shaft within said hollow shaft, and selectively connectable means between said hollow shaft and said gear means and between said shaft within said hollow shaft and said gear means, thereby allowing rotation of said drive wheel in either direction.

3. The invention according to claim 2 which includes means to engage and disengage said drive means from the source of power.

4. The invention according to claim 3 in which said last mentioned means includes a belt pulley driven by the source of power, a drive pulley on said frame operatively connected to said drive means and a belt extending around said pulleys, a belt tightening device mounted on said supporting structure selectively tightening and loosening said belt thereby engaging and disengaging the belt pulley with said drive pulley.

5. The invention according to claim 4 in which said belt tightening device includes an idler pulley mounted on said supporting structure, one run of said belt passing around said idler pulley, an arm pivoted to said supporting structure, said arm being movable from one position to another position and vice-versa, a further idler pulley journalled for rotation on the distal end of said arm, and engaging the other run of said belt and a tension spring urging said further pulley into engagement with said other run when said arm is in said one position and holding said arm over center and operatively disengaged from said other run, when said arm is in said other position.

6. The invention according to claim 4 in which said drive means includes a lay shaft assembly in said frame, said lay shaft assembly including a hollow shaft journalled for rotation within said frame, a shaft within said hollow shaft also journalled for rotation within said frame independently of said hollow shaft, a pulley secured to said hollow shaft, a further pulley secured to said shaft within said hollow shaft, in side by side relationship with said first mentioned pulley, an adjustable idler pulley journalled for rotation in said frame between but spaced from said last mentioned pulleys and at right angles thereto, an endless belt extending around said drive pulley on said frame, around said pulley on said shaft, around said idler pulley in said frame, and around said pulley on said shaft within said hollow shaft, and back to said drive pulley, whereby said pulley on said hollow shaft is rotated in the opposite direction to said pulley on said shaft within said hollow shaft, and selectively connectable means between said hollow shaft and said gear means and between said shaft within said hollow shaft and said gear means, thereby allowing rotation of said drive wheel in either direction.

7. The invention according to claim 5 in which said drive means includes a lay shaft assembly in said frame, said lay shaft assembly including a hollow shaft journalled for rotation within said frame, a shaft within said hollow shaft also journalled for rotation within said frame independently of said hollow shaft, a pulley secured to said hollow shaft, a further pulley secured to said shaft within said hollow shaft, in side by side relationship with said first mentioned pulley, an adjustable idler pulley journalled for rotation in said frame between but spaced from said last mentioned pulleys and at right angles thereto, an endless belt extending around said drive pulley on said frame, around said pulley on said shaft, around said idler pulley in said frame, and around said pulley on said shaft within said hollow shaft, and selectively connectable means between said hollow shaft and said gear means and between said shaft within said hollow shaft and said gear means, thereby allowing rotation of said drive wheel in either direction.

8. The invention according to claim 6 in which said selectively connectable means includes a drive shaft extending from said gear means, a pair of pulleys secured in side by side relationship to said drive shaft, a driven pulley secured to said hollow shaft, a further driven pulley secured to said shaft within said hollow shaft, a slack belt extending around said last mentioned pulley on said hollow shaft and one of said pulleys on said drive shaft and a further slack belt extending around said last mentioned pulley on said shaft within said hollow shaft, and the other of said pulleys on said drive shaft, and means selectively engaging one or the other of said slack belts to tighten same thereby rotating said drive shaft in one direction or the other direction.

9. The invention according to claim 7 in which said selectively connectable means includes a drive shaft extending from said gear means, a pair of pulleys secured in side by side relationship to said drive shaft, a driven pulley secured to said hollow shaft, a further driven pulley secured to said shaft within said hollow shaft, a slack belt extending around said last mentioned pulley on said hollow shaft and one of said pulleys on said drive shaft and a further slack belt extending around said last mentioned pulley on said shaft within said hollow shaft, and the other of said pulleys on said drive shaft, and means selectively engaging one or the other of said slack belts to tighten same thereby rotating said drive shaft in one direction or the other direction.

10. The invention according to claim 8 in which said last mentioned means includes a lever movable endwise from a forward to a reverse drive position and vice-versa, within said frame, belt engaging means extending from each side of said lever, said lever engaging means extending from one side of said lever, engaging the outer surface of one of said slack belts thereby tightening same and slackening the other of said slack belts, when said lever is in one of said drive positions, said belt engaging means extending from the other side of said lever engaging the inner surface of the other of said slack belts thereby tightening same and slackening said one slack belt, when said lever is on the other of said drive positions.

11. The invention according to claim 9 in which said last mentioned means includes a lever movable endwise from a forward to a reverse drive position and vice-versa, within said frame, belt engaging means extending from each side of said lever, said lever engaging means extending from one side of said lever, engaging the outer surface of one of said slack belts thereby tightening same and slackening the other of said slack belts, when said lever is in one of said drive positions, said belt engaging means extending from the other side of said lever engaging the inner surface of the other of said slack belts thereby tightening same and slackening said one slack belt, when said lever is in the other of said drive positions.

12. The invention according to claims 2, 3 or 4 in which said gear means includes a casing secured to said frame, said drive wheel axle extending through said casing, a gear secured to said drive wheel axle within said casing, a drive shaft journalled in said casing and extending therefrom, a worm gear on said drive shaft within said casing, said worm gear engaging said gear, said drive shaft being operatively connected to said drive means.

13. The invention according to claims 1, 6 or 7 in which said gear means includes a casing secured to said frame, said drive wheel axle extending through said casing, a gear secured to said drive wheel axle within said casing, a drive shaft journalled in said casing and extending therefrom, a worm gear on said drive shaft within said casing, said worm gear engaging said gear, said drive shaft being operatively connected to said drive means.

14. The invention according to claims 1, 6 or 7 in which said gear means includes a casing secured to said frame, said drive wheel axle extending through said casing, a gear secured to said drive wheel axle within said casing, one end of said drive shaft being journalled within said casing, a worm gear on said drive shaft within said casing, said worm gear engaging said gear.

15. The invention according to claim 11 in which said gear means includes a casing secured to said frame, said drive wheel axle extending through said casing, a gear secured to said drive wheel axle within said casing, one end of said drive shaft being journalled within said casing, a worm gear on said drive shaft within said casing, said worm gear engaging said gear.

16. The invention according to claim 2 in which said selectively connectable means includes a drive shaft extending from said gear means, a pair of pulleys secured in side by side relationship to said drive shaft, a driven pulley secured to said hollow shaft, a further driven pulley secured to said shaft within said hollow shaft, a slack belt extending around said last mentioned pulley on said hollow shaft and one of said pulleys on said drive shaft and a further slack belt extending around said last mentioned pulley on said shaft within said hollow shaft, and the other of said pulleys on said drive shaft, and means selectively engaging one or the other of said slack belts to tighten same thereby rotating said drive shaft in one direction or the other direction.

17. The invention according to claim 16 in which said last mentioned means includes a lever movable endwise from a forward to a reverse drive position and vice-versa, within said frame, belt engaging means extending from each side of said lever, engaging menas extending from one side of said lever, engaging the outer surface of one of said slack belts thereby tightening same and slackening the other of said slack belts, when said lever is in one of said drive positions, said belt engaging means extending from the other side of said lever engaging the inner surface of the other of said slack belts thereby tightening same and slackening said one slack belt, when said lever is in the other of said drive positions.

* * * * *